United States Patent [19]

King

[11] 4,200,267
[45] Apr. 29, 1980

[54] TANDEM AXLE SUSPENSION WITH IMPROVED EQUALIZER PIVOT ASSEMBLY

[75] Inventor: John B. King, Springfield, Mo.

[73] Assignee: Hutchens Industries Inc., Springfield, Mo.

[21] Appl. No.: 941,579

[22] Filed: Sep. 12, 1978

[51] Int. Cl.² ........................................... B60G 11/04
[52] U.S. Cl. ..................................... 267/52; 403/225
[58] Field of Search ................. 267/36 R, 52, 54 R, 267/54 D, 54 E, 56; 280/680, 682, 686; 403/225, 228

[56] References Cited

U.S. PATENT DOCUMENTS

| | | | |
|---|---|---|---|
| 2,129,656 | 9/1938 | Dougherty | 267/52 |
| 2,810,587 | 10/1957 | Boughner | 280/680 |
| 3,406,439 | 10/1968 | Hutchens | 280/682 |
| 3,504,929 | 4/1970 | King | 280/682 |
| 3,586,308 | 6/1971 | King | 267/52 |
| 3,751,063 | 8/1973 | Raidel | 267/56 |
| 3,841,652 | 10/1974 | Higginson | 280/682 |

Primary Examiner—Edward R. Kazenske
Attorney, Agent, or Firm—Cushman, Darby & Cushman

[57] ABSTRACT

A tandem axle leaf spring suspension in which the structure for pivotally interconnecting each equalizer member to its associated mounting bracket comprises a cylindrical wall member disposed between the mounting bracket plates and two end disks between each end of the cylindrical wall member and the adjacent bracket plate, the cylindrical wall member having a plurality of annularly spaced recesses formed in the opposite end portions thereof defining a plurality of annularly spaced axially extending projections at each end portion thereof and each end disk having a plurality of annularly spaced recesses formed in the exterior periphery thereof defining a plurality of annularly spaced radially extending projections. Each of the end disks is mounted with the radial projections thereof engaged within recesses within the associated end portion of the cylindrical wall member and with the recesses thereof receiving the associated axially extending projections of the cylindrical wall member.

5 Claims, 4 Drawing Figures

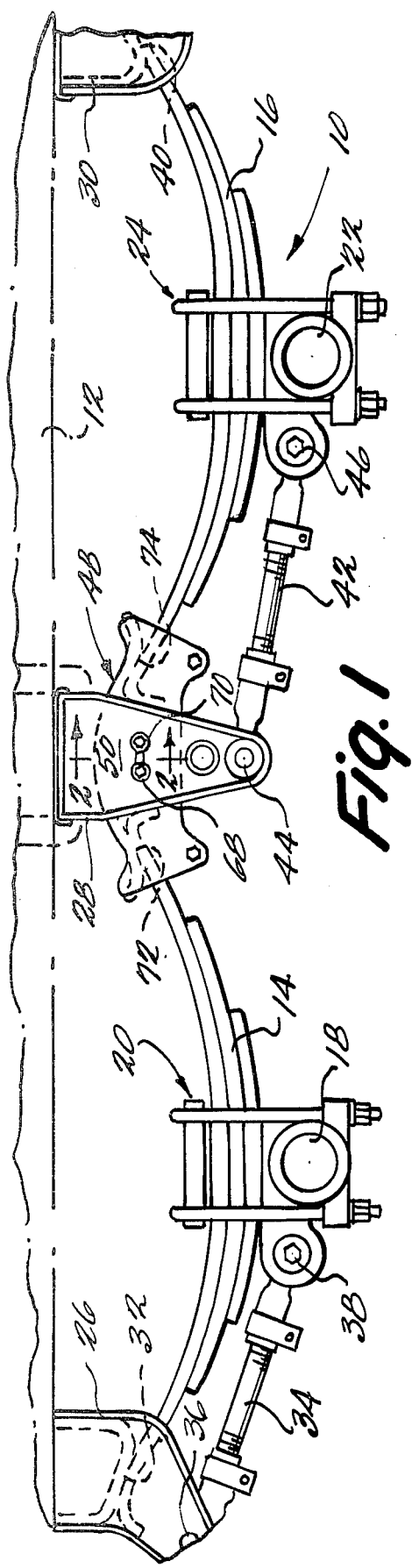
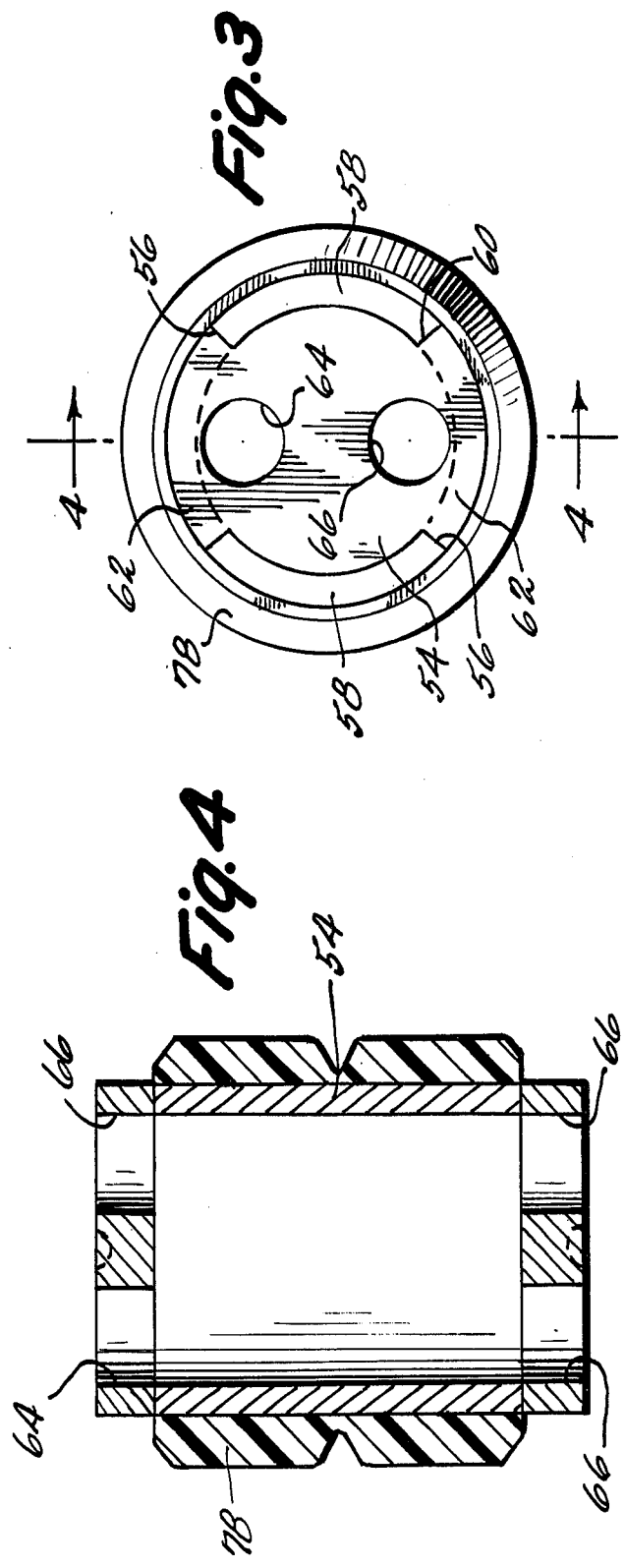

TANDEM AXLE SUSPENSION WITH IMPROVED EQUALIZER PIVOT ASSEMBLY

This invention relates to tandem axle suspensions and, more particularly, to improvements in the equalizer constructions of tandem axle suspensions of the type embodying leaf springs.

Tandem axle suspensions of the type herein contemplated have been commercially-available for many years. Examples of suspensions of this type are disclosed in the following U.S. Pat. Nos. 3,406,439 and 3,586,308. Commercial tandem axle suspensions made by the owner of the above two patents, Hutchens Industries, Inc., are merchandized under the Tradename 8-7600.

The suspensions essentially utilize four leaf spring units which are arranged in pairs, a front pair being transversely spaced with respect to one another and each having a bracket or clamp assembly connecting the central portion thereof with a front axle assembly. Similarly, the rear pair of leaf springs are spaced transversely apart with respect to one another and longitudinally with respect to the first pair of leaf springs. The rear pair of leaf springs has a central portion thereof connected by a bracket or clamp assembly with a transversely extending rear axle assembly.

The front ends of the front pair of leaf springs are connected to the vehicle frame by a pair of transversely spaced front mounting brackets providing a slidable connection with the ends of the springs. A pair of torque arms are connected between the front mounting brackets and the front axle brackets through suitable pivot assemblies in the front and rear ends of the torque rods respectively. Similar rear torque rods are provided between the rear axle brackets and a pair of central mounting brackets. The rear ends of the rear pair of leaf springs are slidably mounted on a pair of transversely spaced rear mounting brackets.

The pair of central mounting brackets pivotally support a pair of equalizers or rockers, the forward support ends of which provide for sliding connection with the rear ends of the forward pair of leaf springs and the rearward support ends of which provide sliding connection for the forward ends of the rearward pair of leaf springs. The pivotal connection between each equalizer and the associated central mounting bracket is essentially in the form of a cylindrical wall member mounted between the two transverse bracket plates of the mounting bracket. Engaged within opposite ends of the cylindrical wall member is a pair of transversely spaced end disks, each having pairs of transversely aligned longitudinally spaced openings extending therethrough for the reception of a pair of bolt assemblies which serve to fixedly maintain the cylindrical wall member in fixed position between the bracket plates. The equalizer is provided with a cylindrical portion in spaced surrounding relation to the cylindrical wall member and a sleeve of rubber is provided between the exterior periphery of the cylindrical wall member and the interior periphery of the cylindrical portion to provide a controlled amount of pivotal movement of the rocker or equalizer with respect to the mounting bracket.

While the arrangement described above has proven to be satisfactory in operation, one problem that has been encountered with the prior art end disk arrangement is that when assembly is accomplished it sometimes occurs that the end disks are driven from their normal position within the end of the cylindrical wall member to a position longitudinally inwardly thereof. In actual practice, the end disks are fixed rotationally in axially aligned relation within the cylindrical wall member by pins or stakes which do not positively prevent such movement. When this unlimited movement occurs, the load carried by the equalizer is then transmitted to the mounting bracket through the bolts with a force distribution which varies from that of the designed shear load distribution. Thus, instead of the bolts being in almost pure shear as would be the case when the end disks are properly positioned within the end of the cylindrical wall member in substantial abutting engagement with the bracket plate, a moment arm is introduced which sets up bending forces which otherwise would not be presented. The effect of this unwanted change in force distribution is to severely reduce the useful life of the pivot assembly.

It is an object of the present invention to provide an improved pivotal assembly for an equalizer in a tandem axle leaf spring suspension which overcomes the disadvantages noted above. In accordance with the principles of the invention, this object is obtained by forming a plurality of annularly spaced recesses in opposite end portions of the cylindrical wall member so as to define a plurality of annularly spaced axially extending projections at each end portion of the cylindrical wall member. Each end disk is formed with a plurality of annularly spaced recesses in the exteiror periphery thereof which define a plurality of annularly spaced radially extending projections. The end disks are then mounted with the radial projections thereof engaged within the recesses within the associated end portion of the cylindrical wall member and with the recesses thereof receiving the associated axially extending projections of the cylindrical wall member therein. In this way, the interengagement between the projections and recesses positively insures against the type of unwanted longitudinally inward movement of the end disks heretofore experienced, while at the same time providing for the proper positioning of the end disks within the cylindrical wall member both with respect to axial alignment as well as angular fixation.

Another object of the present invention is the provision of an improvement in tandem axle suspensions of the type described which is simple in construction, effective in operation and economical to manufacture.

These and other objects of the present invention will become more apparent during the course of the following detailed description and appended claims.

The invention may best be understood with reference to the accompanying drawings wherein the illustrated embodiment is shown.

IN THE DRAWINGS

FIG. 1 is a side elevational view of a tandem axle leaf spring suspension embodying the principles of the present invention;

FIG. 3 is an end view of the improved cylindrical wall member and end disk assembly embodied in the suspension shown in FIG. 1; and FIG. 4 is a sectional view taken along the line 4—4 of FIG. 3.

Figure 2:
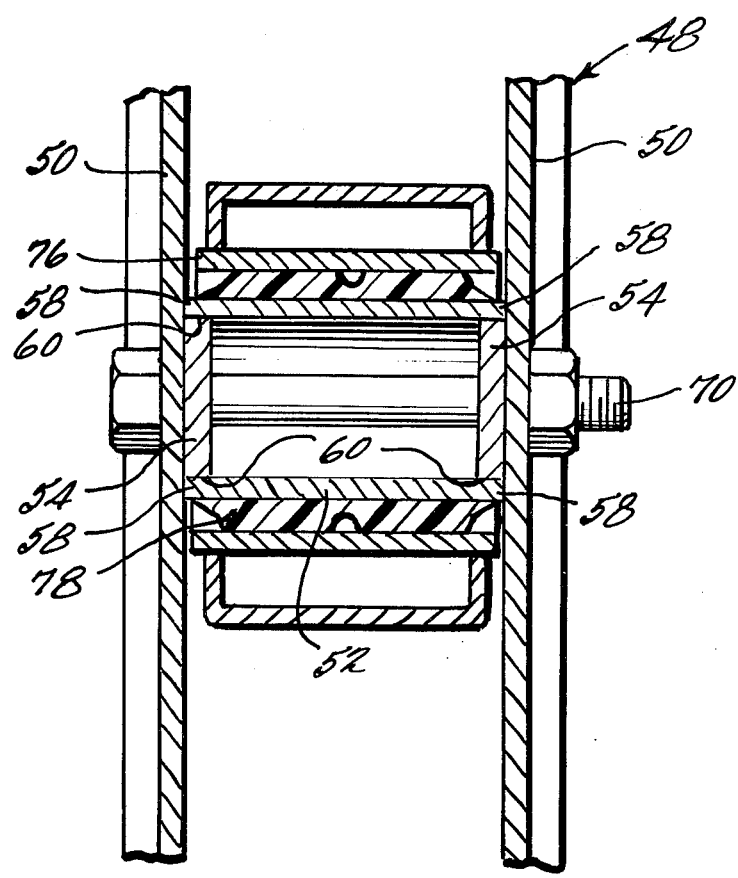
FIG. 2 is an enlarged fragmentary sectional view taken along the line 2—2 of FIG. 1.

Referring now more particularly to FIG. 1 of the drawings, there is shown therein a tandem axle leaf spring suspension, generally indicated at 10, which embodies the principles of the present invention. The tandem axle suspension is shown is side elevational view in FIG. 1 mounted on a vehicle frame, shown in phantom and designated by the numeral 12. It will be understood that the vehicle frame 12 may be of any conventional configuration. A common embodiment of such a configuration is a conventional trailer of a tractor trailer assembly. In FIG. 1, the wheels, which are rotatably supported by the axle assemblies, are not shown for purposes of more illustrating the improvements of the present invention.

As clearly shown, the axle suspension 10 includes the usual pair of front leaf spring assemblies 14 which are disposed in aligned transversely spaced relation with respect to one another and the usual pair of rear leaf spring assemblies 16 which are also transversely spaced with respect to one another and spaced longitudinally rearwardly of the pair of front leaf springs 14. The central portion of the front pair of leaf springs 14 is connected with a front axle assembly 18, as by a pair of clamp or bracket assemblies 20. Similarly, the central portion of the rearward pair of leaf springs 16 are connected with a rear axle assembly 22, as by a pair of clamp or bracket assemblies 24.

The suspension 10 interfaces with the vehicle frame 12 by the provision of a pair of front mounting brackets 26, a pair of central mounting brackets 28 and a pair of rear mounting brackets 30. The brackets of each pair are spaced transversely with respect to one another and longitudinally with respect to the other pairs of mounting brackets. Each front mounting bracket 26 is formed with a rigid downwardly and forwardly facing spring seat 32 for slidably engaging the front end of an associated front leaf spring assembly 14. In addition, each front mounting bracket 26 extends downwardly and forwardly from the spring seat 32 and has the front end of a torque arm 34 pivotally connected therewith, as indicated at 36. The rear end of each torque arm 34 is pivotally connected to the associated clamp or mounting bracket, as indicated at 38.

The pair of rearward mounting brackets 30 are provided with downwardly and rearwardly facing spring seats 40 for slidably engaging the rearward ends of the rearward leaf spring 16.

A pair of rear torque arms 42, similar to the front torque arms 34 associated with the front axle assembly 18, is provided in association with the rearward axle assembly 22. As shown, the forward ends of the rear torque arms 42 are pivotally connected, as indicated at 44, to the lower ends of the central mounting brackets 28, while the rearward ends of the torque arms 42 are pivotally connected with the rear axle brackets, as indicated at 46.

The rearward ends of the front leaf spring assemblies 14 and the forward ends of the rearward leaf spring assemblies 16 are supported on a pair of rockers or equalizer structures, generally indicated at 48.

The improvement of the present invention is more particularly concerned with the structure provided for mounting each of the rockers or equalizer structures 48 on its associated mounting bracket 28. This pivot structure is best shown in FIGS. 2 through 4 and it will be noted that the central bracket 28 includes two transversely spaced parallel bracket plates 50. Mounted between the bracket plates 50 is a cylindrical wall member 52 having a pair of end disks 54 associated with the ends thereof. As best shown in FIG. 3, each end portion of the cylindrical wall member 52 is formed with a plurality of annularly spaced recesses 56 which define a plurality of annularly spaced axially extending projections 58 at each end portion of the cylindrical wall member 52. As shown, the ends of the recesses are defined by radially extending surfaces so that the projections 58 are of segmental configuration. Thus, as shown, there are two diametrically opposed segmental projections 58, each of which has an angular extent of approximately 90°.

The exterior periphery of each of the end disks 54 is likewise formed with a plurality of annularly spaced recesses 60 which define a plurality of annularly spaced radially extending projections 62. As shown, each end disk 54 is mounted with the radial projections 62 thereof engaged within the recesses 56 in the associated end portion of the cylindrical wall member 62 and with the recesses 60 thereof receiving the axially extending projections 58 of the cylindrical wall member 52. As shown, the interengagement between the projections and recesses is such as to generally fixedly position each end disk in axial alignment with respect to the cylindrical wall member 52 not only against movement in a longitudinally inward direction but also against angular displacement. To this end, the radial projections 62 are segmentally shaped of 90° angular extent to snugly engage the two recesses 56. Conversely, recesses 60 are of a size to snugly receive therein projections 58.

It will also be noted that end disks 54 are formed with transversely aligned pairs of forward and rearward longitudinally spaced openings 64 and 66. As best shown in FIG. 3, the axes of the openings 64 and 66 both lie in a common plane which extends radially through the axes of the associated end disks and bisects the diametrically opposed pair of radial projections 62.

As best shown in FIGS. 1 and 2, extending through the forward and rearward pairs of aligned openings 64 and 66 is a pair of forward and rearward both assemblies 68 and 70 which serve to fixedly secure the cylindrical wall member 62 between the bracket plates 50.

It will be understood that each equalizer structure 48 includes a downwardly and rearwardly facing forward spring seat 72 which is slidably engaged by the rear end of the associated forward leaf spring 14 and a downwardly and forwardly facing rear spring seat 74 which slidably engages the forward end of the associated rearward leaf spring 16. Each equalizer structure also includes a central cylindrical portion 76 which is disposed in surrounding relation to the cylindrical wall member 52. A sleeve of rubber 78 is mounted between the exterior periphery of the cylindrical wall member 52 and the interior periphery of the cylindrical portion 76 of the associated equalizer structure. The rubber sleeve 78 may be bonded in accordance with conventional practice so as to provide for the controlled pivotal movement of the associated equalizer structure with respect to the associated mounting bracket.

The operation of the suspension will be apparent to those skilled in the art by virtue of the above description. It is important to note that in mounting each equalizer structure 48 on its associated bracket 28, end disks 54 are engaged within the ends of the cylindrical wall member 54 so that the respective recesses and projections are interengaged. This sub-assembly with the equalizer structure mounted in association therewith is then engaged between the bracket plates 50 and moved into a position so that the pairs of openings 64 and 66 are aligned with the openings in the bracket plates which receive the forward and rearward bolt assemblies 68 and 70. The assembly is completed inserting the bolt assemblies into position and securing the same. It will be noted that the arrangement is such that end disks 54 are prevented from moving longitudinally inwardly with respect to the cylindrical wall member 52 and are fixedly positioned with respect to the cylindrical wall member 52 in axial alignment and against relative angular movement. With this arrangement, the load carried by the equalizer structure 48 is transmitted to the mounting bracket 28 by the bolts 68 and 70 in a manner which insures that the loading will be essentially a shear loading with negligible bending moment.

It will thus be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A tanden axle suspension for a vehicle frame including front and rear spring means for resiliently supporting front and rear transversely extending axles respectively, mounting means for supporting the front and rear ends of said front and rear spring means respectively, and equalizer means for supporting the rear and front ends of said front and rear spring means respectively, said equalizer means including an equalizer bracket adapted to be attached to the vehicle frame, said bracket including a pair of transversely spaced bracket plates having longitudinally spaced first and second pairs of transversely aligned apertures extending transversely therethrough, a cylindrical wall member disposed between said bracket plates with its axis disposed parallel to and between the longitudinally spaced axes of said first and second pairs of apertures, an end disk adjacent each end of said cylindrical wall member and the associated bracket plate, said end disks having longitudinally spaced first and second pairs of transversely aligned openings extending transversely therethrough in transverse alignment with said first and second pairs of apertures respectively, first and second bolt assemblies extending through said first and second apertures and openings respectively and through said cylindrical wall member fixedly securing the same together, an equalizer member having a cylindrical wall portion disposed in surrounding relation to said cylindrical wall member, and a resilient annular member between the exterior periphery of said cylindrical wall member and the interior periphery of said cylindrical wall portion, the improvement in combination therewith which comprises said cylindrical wall member including a plurality of annularly spaced recesses formed in opposite end portions thereof defining a plurality of annularly spaced axially extending projections at each end portion thereof, each of said end disks having a plurality of annularly spaced recesses formed in the exterior periphery thereof defining a plurality of annularly spaced radially extending projections, each of said end disks being mounted with the radial projections thereof engaged within the recesses within the associated end portion of said cylindrical wall member and with the recesses thereof receiving the associated axially extending projections of said cylindrical wall member.

2. The improvement as defined in claim 1, wherein there are two diametrically opposed recesses in opposite end portions of said cylindrical wall member defining two diametrically opposed axially extending projections at each end portion thereof, each of said end disks having two diametrically opposed recesses defining two radially extending projections.

3. The improvement as defined in claim 2, wherein the ends of said recesses are defined by radially extending surfaces and said projections are of segmental configuration.

4. The improvement as defined in claim 3, wherein said recesses and projections have an arcuate extent of 90°.

5. The improvement as defined in claim 1, 2, 3, or 4, wherein said projections and recesses are disposed in snug interengagement.

* * * * *